B. ZUCK & W. E. McVAY.
GEAR CASING.
APPLICATION FILED MAR. 1, 1917.

1,232,881.

Patented July 10, 1917.

UNITED STATES PATENT OFFICE.

BERT ZUCK AND WALTER E. McVAY, OF CRAWFORDSVILLE, INDIANA.

GEAR-CASING.

1,232,881.   Specification of Letters Patent.   Patented July 10, 1917.

Application filed March 1, 1917. Serial No. 151,653.

*To all whom it may concern:*

Be it known that we, BERT ZUCK and WALTER E. McVAY, citizens of the United States, residing at Crawfordsville, in the county of Montgomery and State of Indiana, have invented certain new and useful Improvements in Gear-Casings, of which the following is a specification.

This invention relates to gear casings and especially to those adapted to fit in connection with a cooling fan for an automobile motor.

One object of our device is to provide an improved housing or guard for the fan belt to prevent the surplus oil from the fan pulley bearings from being blown by the air from the cooling fan over the exposed parts of the engine, also to protect the water hose from the oil. Other objects will become apparent as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views:—

Figure 1:
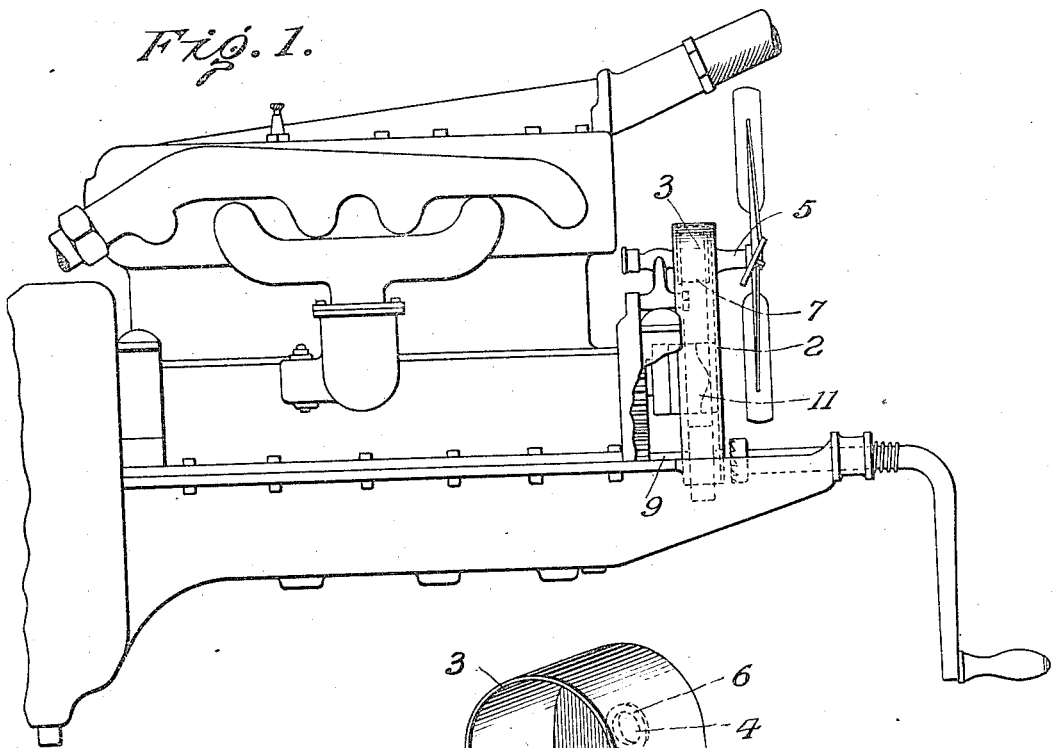
Figure 1 is a side elevation of the gear casing applied to a Ford motor.
Figure 2:
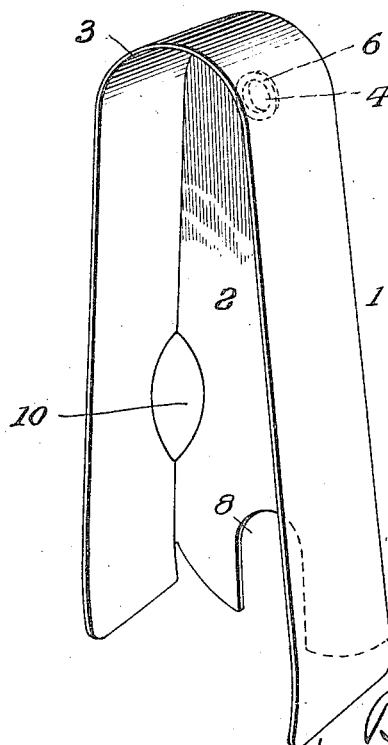
Fig. 2 is a perspective view of the gear casing.

Referring more in detail to the drawings, the guard or casing 1 is provided with a solid body or back plate 2, having an inverted U-member 3 extending forwardly therefrom to house the fan and shaft pulleys and belt.

In the back plate 2 is formed an opening 4 to receive the fan shaft 5. An annular thrust bearing 6 of suitable hardened material is mounted on the plate above the opening 4 to reinforce the surrounding edge and provide a bearing surface for withstanding the constant wear of said revolving pulley 7.

In the lower edge of the back plate is formed a shaft recess 8, which is adapted to slide over the drive shaft 9, thereby holding the plate in position. A notched out opening 10 is provided in one side of the casing at the junction of the back plate and the inverted U-member or flange, thereby forming a seat for the commutator 11 to engage in for further steadying the guard.

It will be noted that the inverted U-member attached to the back plate is used as a trough to collect and deliver the particles of oil that are blown about, below the current of air from the fan, thereby preventing these particles from being blown over the exposed parts of the motor.

To place the housing in position, it is only necessary to place the back plate over the fan pulley shaft and back of the belt, at the same time sliding the lower recessed end over the drive pulley shaft at the bottom. The commutator is so placed that when the guard is in position, that it will seat in the opening formed in the side of said guard, thereby acting as a support and also holding it from lateral movement.

In a great many automobiles, there is a loose connection from the radiator to the water manifold, thereby causing a leakage of water at the joint. As this joint is directly over the fan pulley, unless there is some means for preventing it, there will be much trouble caused by the hot water dripping on the belt. This in time will cause the belt to wear away faster than it should, thereby necessitating the purchase of a new one.

This improved guard also does away with the danger that has always existed, by protecting the fingers of the person who is making adjustments to his machine at a point near the fan and pulley. It will be seen that it will be impossible for a person to get their fingers caught in the belt and thereby be mashed when brought in engagement with the pulley or the fan.

The device is so simple in construction that it will take very little time or money to make them. It is so readily applied that it does not take an expert mechanic to place it in position, but a person inexperienced with tools may easily and in few seconds position it.

This housing or casing may be made from any suitable material, as the maker sees best.

Having thus described our invention what we claim as new and desire to secure by Letters Patent of the United States is:—

1. A combined guard and housing for the fan drive of an automobile power plant, comprising a solid body portion having an opening in its upper end to receive the fan shaft and a recessed bottom edge to straddle the engine drive shaft, and a forwardly extending flange on the body to house the fan belt, said guard further having a seat provided intermediate the opening and recessed edge of the body to engage with the engine.

2. In combination with an automobile power plant including an engine, its driving shaft, a fan shaft, and a belt connecting the shafts, a guard comprising a solid body portion having an opening in its upper end to receive the fan shaft and a recessed bottom edge to straddle the engine drive shaft, and a forwardly extending flange on the body to house the fan belt, said guard also having a seat provided intermediate the opening and recessed edge of the body, thereby being adapted to engage with a part of the engine to prevent lateral movement.

In testimony whereof we affix our signatures in the presence of two witnesses.

BERT ZUCK.
WALTER E. McVAY.

Witnesses:
BYRON R. RUSSELL,
HATTIE B. EBAUGH.

Copies of this patent may be obtained for five cents each, by addressing the "Commissioner of Patents, Washington, D. C."